United States Patent [19]
Pierce

[11] Patent Number: 5,701,156
[45] Date of Patent: Dec. 23, 1997

[54] APPARATUS FOR OBSERVING THE DISPERSION PATTERN OF THE SPRAY PLUME OF A SPRAY NOZZLE

[76] Inventor: James A. Pierce, 3 Laurel Tree La., Foxboro, Mass. 02035

[21] Appl. No.: 449,787

[22] Filed: May 24, 1995

[51] Int. Cl.⁶ .................................................. H04N 7/18
[52] U.S. Cl. .................. 348/86; 348/92; 348/132; 239/71; 356/23; 356/336
[58] Field of Search ...................... 348/86, 92, 125, 348/127, 131, 132, 135, 61, 143; 239/71; 356/23, 335, 336; 73/865.8, 119 A; H04N 7/18

[56] References Cited

U.S. PATENT DOCUMENTS

| | | | |
|---|---|---|---|
| 3,275,744 | 9/1966 | Dietrich | 348/132 |
| 3,609,043 | 9/1971 | Simmons et al. | 356/335 |
| 4,095,775 | 6/1978 | Hotham | 356/336 |
| 4,389,115 | 6/1983 | Richter | 359/641 |
| 4,628,465 | 12/1986 | Ito et al. | 348/83 |
| 5,189,490 | 2/1993 | Shetty et al. | 348/128 |
| 5,285,287 | 2/1994 | Shikama | 348/745 |

*Primary Examiner*—Tommy P. Chin
*Assistant Examiner*—Bryan S. Tung
*Attorney, Agent, or Firm*—William Nitkin

[57] ABSTRACT

An apparatus and method for detecting and analyzing the parameters of the dispersion pattern of the spray plume from the orifice of a spray device or nozzle utilizing an electro-optical device having at least one television camera positioned to detect the image of a gas plume from the spray device or nozzle, such image created by the gas plume's different index of refraction from the index of refraction of the air surrounding it with such image formed by having collimated light passed through the spray plume onto a screen which is positioned before the television camera.

8 Claims, 3 Drawing Sheets

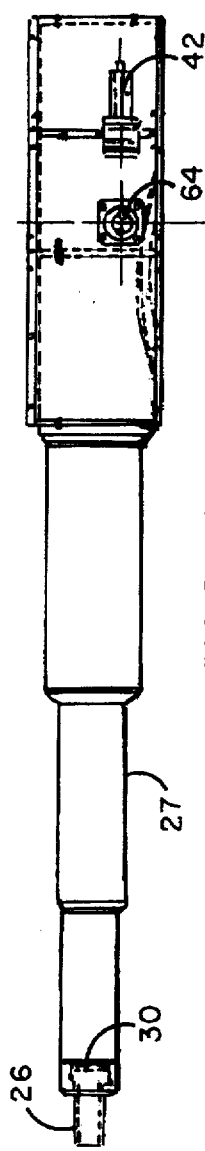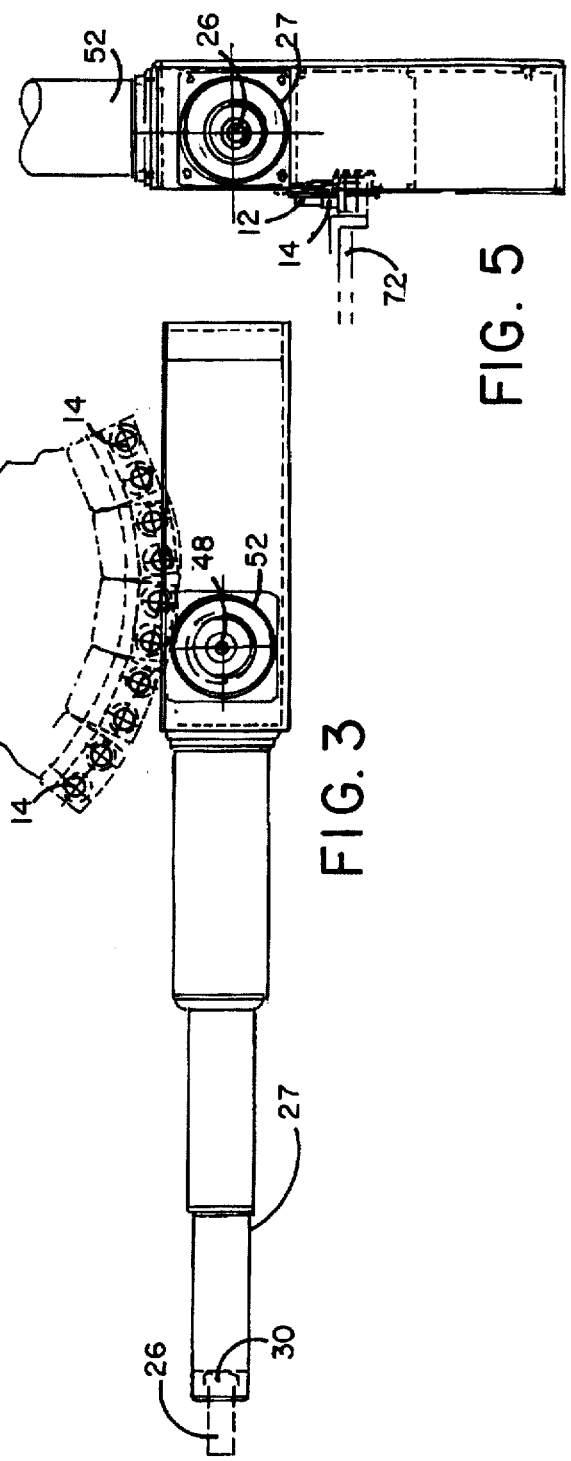

APPARATUS FOR OBSERVING THE DISPERSION PATTERN OF THE SPRAY PLUME OF A SPRAY NOZZLE

BACKGROUND OF THE INVENTION

1. Field of the Invention

The apparatus of this invention resides in the field of electro-optical devices for observing a spray pattern and more particularly relates to testing apparatus and method of use for measuring the quality of manufactured spray nozzles.

2. Description of the Prior Art

Spray nozzles attachable to pressurized or aerosol cans containing products of all descriptions are presently manufactured in enormous quantities throughout the world. Other spraying devices are also well known which generally disperse a liquid through an orifice in a spray. Materials such as finishes, lubricants, toiletries and insect repellants to name a few are packaged in hand-held cans and dispensed by the pressure contained therein by depressing a nozzle-containing button mounted atop the can, thereby allowing the product to emanate from the container through the nozzle in a pattern suitable to the purpose of the material.

The orifices of such nozzles or spray devices are quite small and incapable of being examined for quality by mere visual observation. Even a small change in the shape of the orifice can produce a resultant spray pattern completely unsuited for the purpose for which the product is sold.

To Applicant's knowledge the only method of nozzle or spray device testing presently in use is random sampling of completed units according to a predetermined regimen of boundary parameters. Such testing method, though, is somewhat inaccurate, wasteful of product which then cannot be sold, and tests only a small number of nozzles or spray devices.

SUMMARY OF THE INVENTION

It is an object of the present invention to provide testing apparatus which will examine one or more spray devices or nozzles in sequence for quality control purposes.

The invention may be summarized as an electro-optical device and method of use for observing, analyzing and/or recording the parameters of the dispersion pattern of the spray plume emanating from a subject spray device or nozzle, hereinafter collectively referred to as nozzles. The method of use is accomplished by providing a substantially light-impervious enclosure and directing a nozzle spray plume of, for example, an inert gas such as helium within the enclosure; directing a light beam through the plume and onto a reflective screen; and observing with a television camera the disturbance in the index of refraction of air caused by the plume. In a further embodiment of the invention the combination of a second light beam, screen and camera can be added to examine a second plume dimension and to detect angular separation of selected plume diameters as may be desired. A signal processor such as a computer, television monitor, or both in combination, is used to observe, record and analyze the spray pattern. Where desired, the computer can be further used to automate the entire process of sequentially presenting a plurality of nozzles for examination and summarizing the results of testing an entire batch from a production process.

In the preferred embodiment of the invention, a fiber optic unit is placed at the focal point of a concave collimating mirror which is positioned to direct a beam of parallel light through the plume and onto the screen. Typical nozzle spray patterns are elongated and somewhat oval in shape. Parameters which can be measured by the apparatus of this invention include the minimum and maximum diameters of the plume as well as tangent angles of the plume envelope.

The particular features and advantages of the invention will be more fully understood from the description of the preferred embodiment taken with the drawings which follow.

BRIEF DESCRIPTION OF THE DRAWINGS

FIG. 3 illustrates a cutaway top view of the apparatus of FIG. 1.

FIG. 4 illustrates a cutaway bottom view of the apparatus of FIG. 1.

FIG. 5 illustrates a right side view of the apparatus of FIG. 1.

DESCRIPTION OF THE PREFERRED EMBODIMENT(S)

Figure 1:
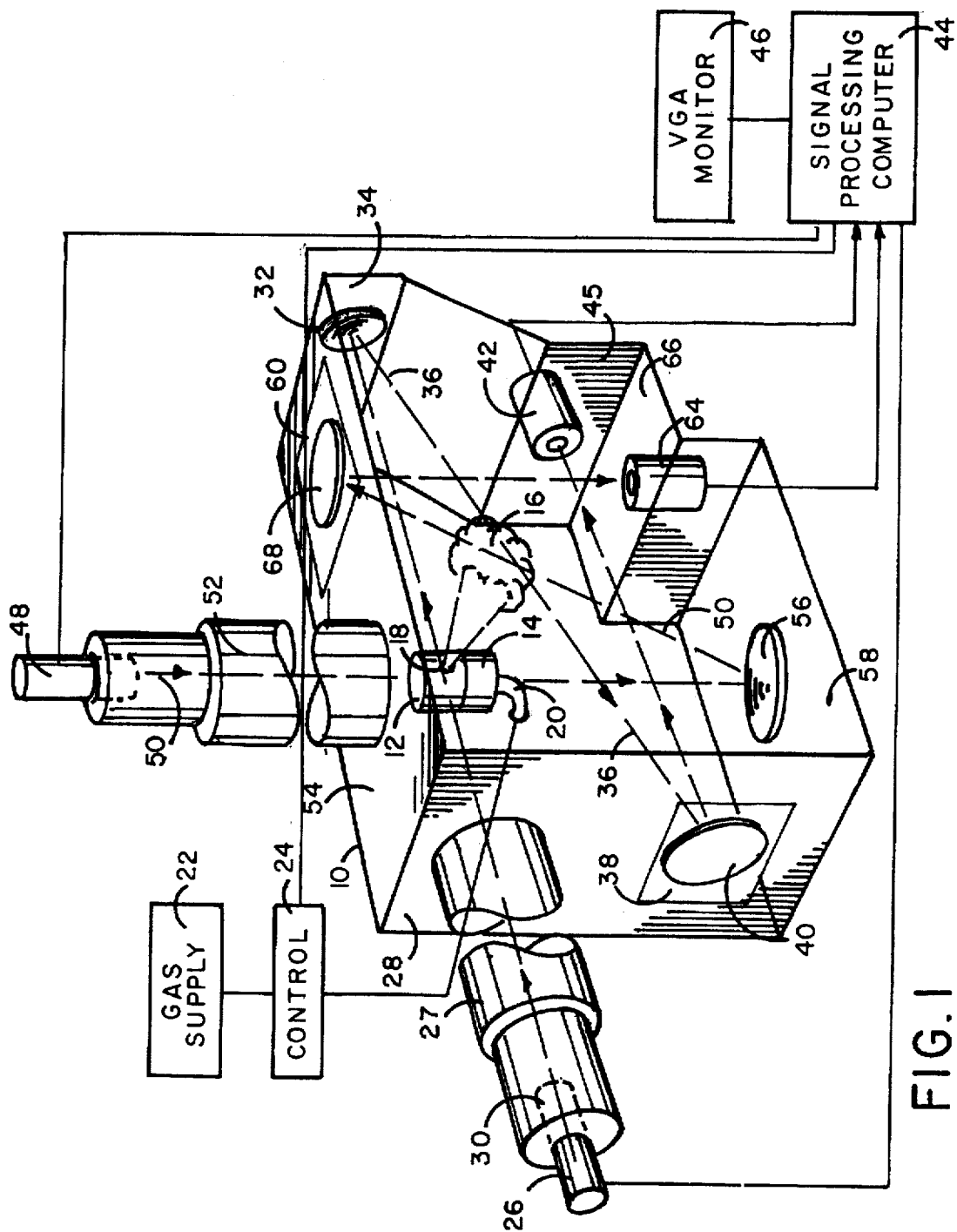
FIG. 1 illustrates a perspective view of the preferred embodiment of the apparatus of this invention.

FIG. 1 illustrates a perspective view of the preferred embodiment of the apparatus of this invention. Enclosure 10 is substantially light-impervious and serves not only as the environment for examining the spray plume, but also as a mounting stage for the various components of the apparatus. Spray device or nozzle 12, affixed to platform 14, is positioned outside enclosure 10 and positioned to produce a spray plume 16 which enters enclosure 10 through orifice 18 when nozzle 12 is charged with gas, preferably an inert gas such as helium. The gas is supplied to the nozzle through pipe 20 from source 22 which is activated and pressure-regulated by control 24. A light source consisting of a fiber optic light pipe 26 is mounted in extension tube 27 on wall 28 and has an exit surface 30. Concave mirror 32 mounted on wall 34 has a focal point coinciding with surface 30 and provides a beam of collimated light beam 36 directed to pass through spray plume 16. Spray plume 16 consists of an envelope of gas which replaces whatever material will emanate from the spray device or nozzle when the nozzle is attached to a finished product. Such gas plume, being a different material than the air in enclosure 10, alters the index of refraction within the envelope which is capable of producing an image on a reflective screen. Screen 38 is mounted on wall 28 in a position to intercept collimated light beam 36 as it passes through plume 16, resulting in plume image 40 on screen 38. Image 40 is monitored by television camera 42 mounted on wall 45 directly opposite screen 38. The electrical signal produced by camera 42 in response to image 40 is then processed in order to observe, record and/or analyze the parameters of plume 16 which are directly related to the shape of the orifice of nozzle 12. The signal processor can be, for example, a computer 44, a video monitor 46 or a combination of both with suitable data storage and retrieval capability.

The above described imaging system can be replicated to provide an alternative view of the plume in order to yield additional dimensional and angular information which is indicative of the parameters of the plume and the nozzle. A second imaging combination is thus provided by fiber optic light pipe 48, producing light beam 50, mounted in extension tube 52 on wall 54. Collimating concave mirror 56 mounted on wall 58 directs light beam 50 through plume 16 at a preselected angle to reflecting imaging screen 60 mounted on wall 54 on which is created plume image 68. Television camera 64 is positioned on wall 66 to view plume image 68 and provides electrical signals suitable for processing by computer 44 and also shown on video monitor 46. The second imaging system is intended to function in exactly the same manner as the first system described above and provides a different view of plume 16.

Figure 2:
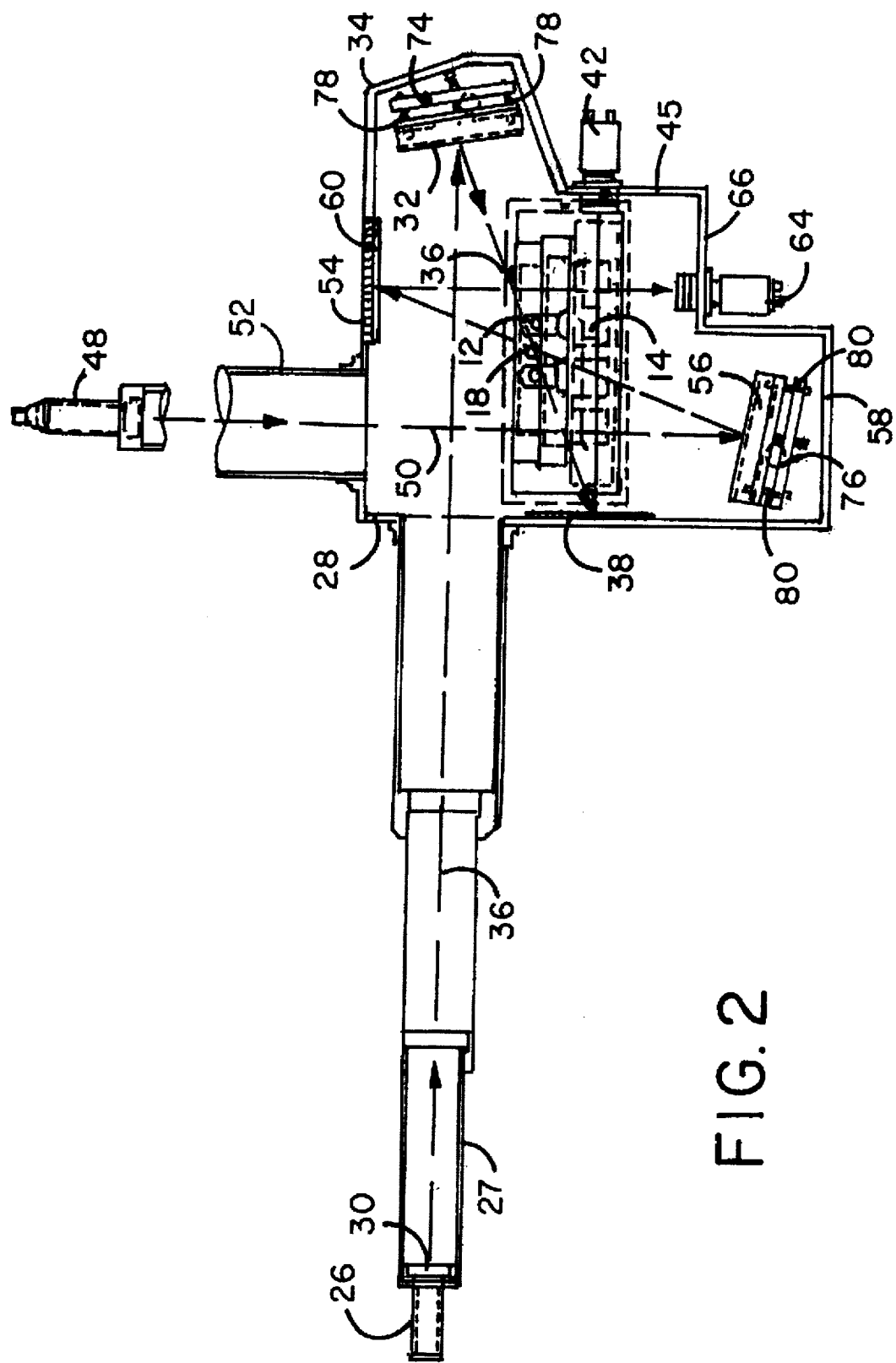
FIG. 2 illustrates a cutaway side view of the apparatus of FIG. 1.

FIGS. 2–5 illustrate, respectively, side, top, bottom and right side views of the apparatus of FIG. 1 in which like numbers refer to like parts of FIG. 1. Additionally in FIG. 3 is shown apparatus providing for the sequential presentation of a plurality of spray devices or nozzles to enclosure 10, such apparatus comprising a rotatable tray or dial 72. Tray 72 can be advanced, for example, by a step motor, not shown, to allow rapid automatic testing of a sample lot of manufactured nozzles. As seen in FIG. 2 mirrors 32 and 56 can be mounted, respectively, on platforms 74 and 76 by adjustable screws 78 and 80 to provide for the precise alignment and configuration, respectively, of light beams 36 and 50.

Although the present invention has been described with reference to particular embodiments, it will be apparent to those skilled in the art that variations and modifications can be substituted therefor without departing from the principles and spirit of the invention.

I claim:

1. Apparatus for enabling the observation of a first and second dispersion pattern of a spray plume from an orifice of a spray device or nozzle hereinafter referred to collectively as a nozzle, comprising in combination:

a substantially light-impervious enclosure;

nozzle support means for positioning said nozzle to provide for said said spray plume emanating from said nozzle to be contained within said enclosure;

gas supply means connected to said nozzle;

control means interposed between said gas supply means and said nozzle to produce said spray plume within said enclosure upon activation of said control means;

a first light beam source positioned to produce a first light beam;

a first concave minor having a focal length, said first concave mirror positioned a distance from said first light source, said distance equal to the focal length of said first concave mirror, said first concave mirror arranged to reflect said first light beam as a first collimated light beam through said spray plume;

a first screen positioned to receive said first collimated light beam from said first mirror to reflect said first dispersion pattern of said spray plume;

a first television camera positioned to detect said first dispersion pattern;

signal processing apparatus connected to said first television camera for examining said first dispersion pattern;

a second light beam source positioned to produce a second light beam;

a second concave mirror having a focal length positioned a distance from said second light source, said distance equal to the focal length of said second concave mirror, said second concave mirror arranged to reflect said second light beam as a second collimated light beam through said spray plume at a selected angle to said first collimated light beam;

a second screen positioned to receive said second light beam from said second concave mirror to reflect said second dispersion pattern of said spray plume; and a second television camera positioned to detect said second dispersion pattern, said second television camera connected to said signal processing apparatus.

2. The apparatus of claim 1 wherein said signal processing apparatus comprises a computer for recording and analyzing the parameters of said first and second dispersion patterns.

3. The apparatus of claim 2 wherein said signal processing apparatus further includes at least one television monitor for visual observation of said dispersion patterns.

4. The apparatus of claim 2 wherein said support means comprises means for mounting a plurality of nozzles and for sequentially moving said nozzles to and from said enclosure.

5. The apparatus of claim 4 wherein said apparatus therefor further includes:

means to present a nozzle to said enclosure;

means to activate said first and second light beam sources;

means to activate said first and second television cameras;

means to activate said gas supply; and means to remove said nozzle from said enclosure.

6. The apparatus of claim 1 wherein said gas supply means comprises a supply of inert gas.

7. The apparatus of claim 6 wherein said inert gas comprises helium.

8. A method for enabling observation of first and second dispersion patterns of a spray plume from an orifice of a spray device or nozzle hereinafter referred to collectively as a nozzle, comprising the steps of:

providing a substantially light-impervious enclosure;

positioning said nozzle relative to said enclosure to contain a spray plume emanating from said nozzle within said enclosure;

providing a gas supply connected to said nozzle and activating said gas supply to produce said spray plume;

providing a first light source for projecting light;

providing a first concave mirror positioned a distance corresponding to its focal length from said first light source;

collimating said light by reflecting said light off said first concave mirror and passing said light through said spray plume at a first angle;

providing a first screen to receive said collimated light reflected from said first concave mirror after passing through said spray plume;

forming a spray plume image on said first screen;

providing a first television camera having an electrical analog output to receive said image of said spray plume;

providing a signal processor to receive said electrical analog output of said first television camera;

examining the output of said signal processor to determine the parameters of said first dispersion pattern;

providing a second structure relative to said enclosure comprising a second light source, a second concave mirror, a second screen and a second television camera corresponding, respectively, to said first light source, said first concave mirror, said first screen and said first television camera, said second structure projecting its collimated light through said spray plume at an angle to said first angle; and directing the output of said second television camera to said signal processor to determine the parameters of said second dispersion pattern of said spray plume.

* * * * *